(12) United States Patent
Lee et al.

(10) Patent No.: US 7,576,821 B2
(45) Date of Patent: Aug. 18, 2009

(54) IN-PLANE SWITCHING LIQUID CRYSTAL DISPLAY DEVICE AND METHOD FOR FABRICATING THE SAME

(75) Inventors: Dong-Hoon Lee, Gyeongsangbuk-do (KR); Jong-Sung Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 876 days.

(21) Appl. No.: 09/901,079

(22) Filed: Jul. 10, 2001

(65) Prior Publication Data

US 2002/0089631 A1    Jul. 11, 2002

(30) Foreign Application Priority Data

Jul. 10, 2000  (KR) ................. 2000-39404

(51) Int. Cl.
 *G02F 1/1343* (2006.01)
(52) U.S. Cl. .................................... 349/141
(58) Field of Classification Search .......... 349/141
 See application file for complete search history.

(56) References Cited

U.S. PATENT DOCUMENTS

| | | | | |
|---|---|---|---|---|
| 5,581,382 | A * | 12/1996 | Kim .......................... | 349/42 |
| 5,598,285 | A | 1/1997 | Kondo et al. .................. | 349/39 |
| 5,838,037 | A | 11/1998 | Masutani et al. ............ | 257/296 |
| 5,946,060 | A | 8/1999 | Nishiki et al. ................. | 349/48 |
| 5,990,987 | A | 11/1999 | Tanaka ........................ | 349/43 |
| 6,028,653 | A | 2/2000 | Nishida ....................... | 349/141 |
| 6,097,454 | A | 8/2000 | Zhang et al. .................. | 349/43 |
| 6,163,355 | A * | 12/2000 | Chang et al. ................. | 349/141 |
| 6,266,116 | B1 | 7/2001 | Ohta | |
| 6,288,763 | B1 | 9/2001 | Hirota | |
| 6,297,866 | B1 | 10/2001 | Seo et al. | |
| 6,300,995 | B1 * | 10/2001 | Wakagi et al. ............. | 349/141 |
| 6,356,328 | B1 * | 3/2002 | Shin et al. .................... | 349/141 |

(Continued)

FOREIGN PATENT DOCUMENTS

JP          09-005764          1/1997

(Continued)

OTHER PUBLICATIONS

R. Kieler et al.; "In-Plane Switching of Nematic Liquid Crystals"; Japan Display '92; pp. 547-550.

(Continued)

*Primary Examiner*—Timothy Rude
(74) *Attorney, Agent, or Firm*—McKenna Long & Aldridge LLP (57) ABSTRACT

An IPS-LCD device includes first and second substrates, and a liquid crystal interposed therebetween. The first substrate includes common and pixel electrodes that are formed of a transparent conductive material. Because the common and pixel electrodes are transparent, aperture ratios of the inventive IPS-LCD device are increased. Furthermore, the first substrate includes an organic material in order to insulate the common electrodes against a data lines. Due to the low dielectric constant of the organic material, the common electrodes and the data lines can be closer with low effect of cross talk, thereby increasing the aperture ratios of the inventive IPS-LCD device. Accordingly, the brightness of the inventive IPS-LCD device is improved.

28 Claims, 8 Drawing Sheets

U.S. PATENT DOCUMENTS 6,414,729 B1 * 7/2002 Akiyama et al. .............. 349/38
6,507,382 B1 * 1/2003 Sakamoto et al. ........... 349/141

FOREIGN PATENT DOCUMENTS

| JP | 09-073101 | | 3/1997 |
|----|-----------|---|--------|
| JP | 09-101538 | | 4/1997 |
| JP | 09-105908 | | 4/1997 |
| JP | 2000-111957 | * | 4/2000 |
| JP | 2001154636 | | 8/2001 |
| KE | 10-0293432 | | 4/2001 |
| KR | 10-0269351 | | 7/2000 |

OTHER PUBLICATIONS

M. Oh-e, et al.; "Principles and Characteristics of Electro-Optical Behaviour with In-Plane Switching Mode"; Asia Display '95; pp. 577-580.

M. Ohta et al.; "Development of Super-TFT-LCDs with In-Plane Switching Display Mode"; Asia Display '95; pp. 707-710.

S. Matsumoto et al.; Display Characteristics of In-Plane Switching (IPS) LCDs and a Wide-Viewing-Angle 14.5-in. OPS TFT-LCD; Euro Display '96; pp. 445-448.

H. Wakemoto et al.; "An Advanced In-Plane Switching Mode TFT-LCF"; SID 97 Digest; pp. 929-932.

S.H. Lee et al.; High-Transmittance, Wide-Viewing-Angle Nematic Liquid Crystal Display Controlled by Fringe-Field Switching; Asia Display '98; pp. 371-374.

Korean Office Action dated Dec. 6, 2005.

* cited by examiner

IN-PLANE SWITCHING LIQUID CRYSTAL DISPLAY DEVICE AND METHOD FOR FABRICATING THE SAME

This application claims the benefit of Korean Patent Application No. 2000-39404, filed on Jul. 10, 2000, which is hereby incorporated by reference as if fully set forth herein.

BACKGROUND OF THE INVENTION

1. Field of the Invention

The present invention relates to a liquid crystal display device, and more particularly to a liquid crystal display device implementing in-plane switching (IPS), where an electric field applied to liquid crystal is generated in a plane parallel to a substrate.

2. Discussion of the Related Art

Recent liquid crystal display devices use the optical anisotropy and polarization properties of liquid crystal molecules to produce an image. Liquid crystal molecules have a definite orientational alignment as a result of their long, thin shapes. That orientational alignment can be controlled by an applied electric field. In other words, as an applied electric field changes, so does the alignment of the liquid crystal molecules. Due to the optical anisotropy, the refraction of incident light depends on the orientational alignment of the liquid crystal molecules. Thus, by properly controlling an applied electric field a desired light image can be produced.

While various types of liquid crystal display devices are known, active matrix LCDs (AM-LCDs) having thin film transistors and pixel electrodes arranged in a matrix are probably the most common. This is because such AM-LCDs can produce high quality images at reasonable cost.

Recently, light and thin liquid crystal display (LCD) devices with low power consumption are used in office automation equipment and video units and the like. Driving methods for such LCDs typically include a twisted nematic (TN) mode and a super twisted nematic (STN) mode. Although TN-LCDs and STN-LCDs have been put to practical use, they have a drawback in that they have a very narrow viewing angle. In order to solve the problem of narrow viewing angle, in-plane switching liquid crystal display (IPS-LCD) devices have been proposed. The IPS-LCD devices typically include a lower substrate (often referred to as an array substrate) where a pixel electrode and a common electrode are disposed, an upper substrate having no electrode, and a liquid crystal interposed between the upper and lower substrates.

A detailed explanation for operation modes of a typical IPS-LCD device will be provided referring to FIGS. 1 to 5.

Figure 1:
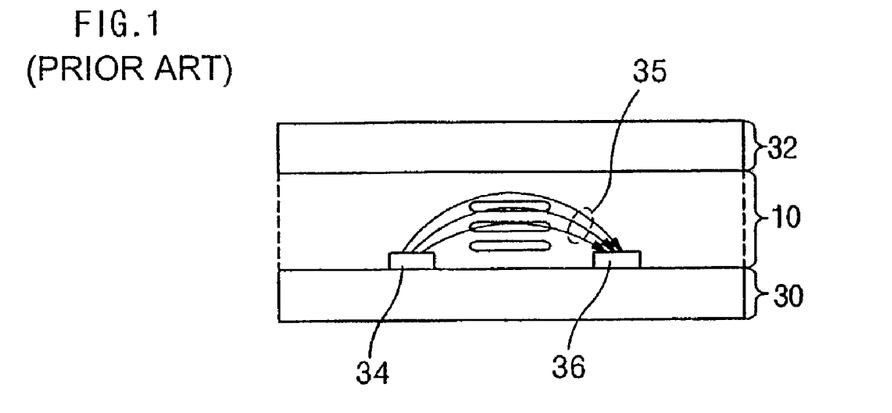
FIG. 1 is a cross-sectional view illustrating a typical IPS-LCD device.

FIG. 1 is a cross-sectional view illustrating a typical IPS-LCD device. As shown in FIG. 1 lower and upper substrates 30 and 32 are spaced apart from each other, and a liquid crystal 10 is interposed therebetween. The lower and upper substrates are called array and color filter substrates, respectively. Pixel and common electrodes 34 and 36 are disposed on the lower substrate 30. The pixel and common electrodes 34 and 36 are parallel with and spaced apart from each other. Although not depicted in FIG. 1, a color filter is usually disposed on a surface of the upper substrate 32 and opposes the lower substrate 30. The pixel and common electrodes 34 and 36 apply an electric field 35 to the liquid crystal. The liquid crystal has a negative dielectric anisotropy, and thus it is aligned parallel with the electric field 35.

Figure 2:
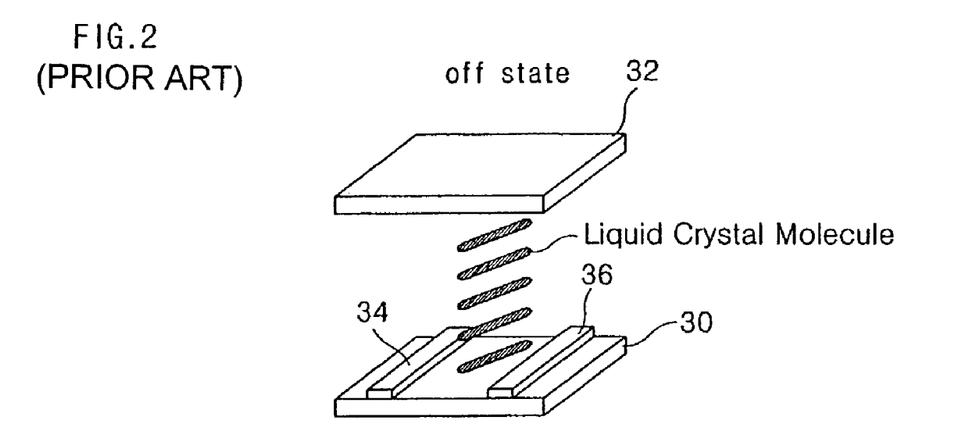
FIGS. 2 to 5 are perspective views conceptually illustrating operation modes of a conventional IPS-LCD device.
Figure 3:
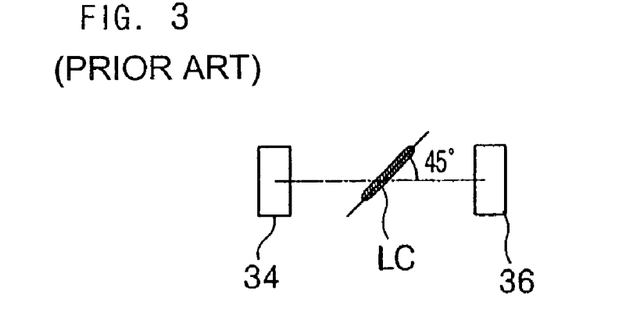

FIGS. 2 to 5 conceptually illustrate operation modes of a conventional IPS-LCD device. Referring to FIGS. 2 and 3, when there is no electric field between the pixel and the common electrodes 34 and 36, i.e., OFF state, the long axes of the liquid crystal molecules maintain an angle from a line perpendicular to the parallel pixel and common electrodes 34 and 36. Herein, the angle is 45 degrees, for example.

Figure 4:
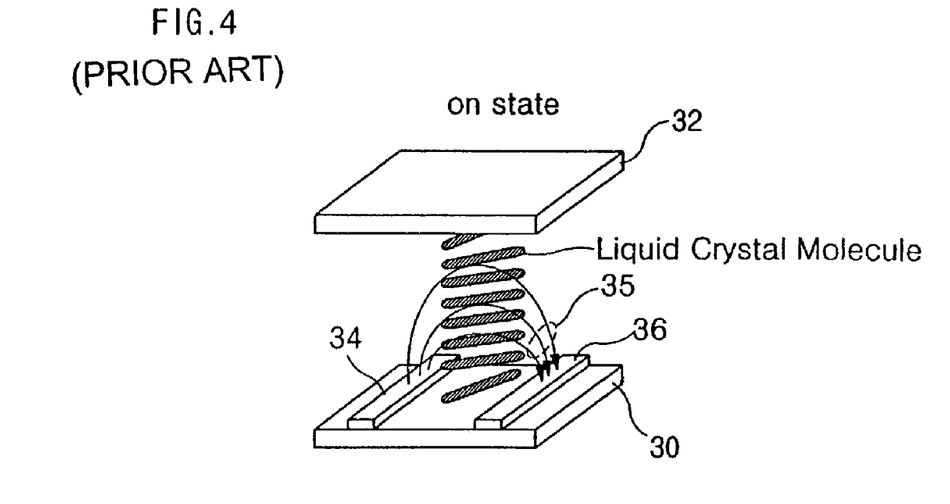
Figure 5:
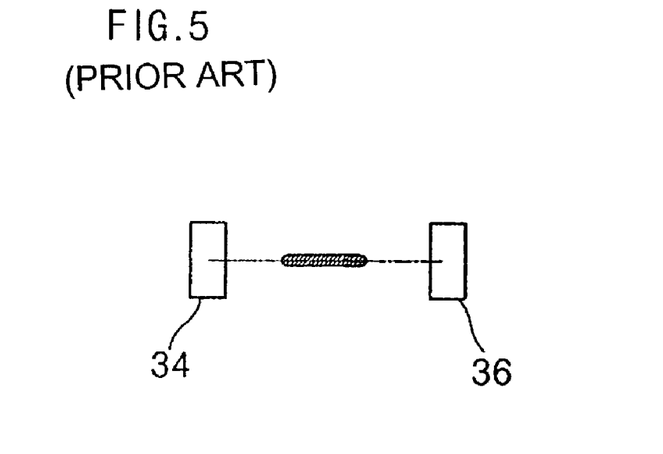

On the contrary, when the pixel and common electrodes 34 and 36 receive voltages, i.e., ON state, there is the in-plane electric field 35 parallel to the surface of the lower substrate 30 between the pixel and common electrodes 34 and 36, as shown in FIGS. 4 and 5. The in-plane electric field 35 is parallel to the surface of the lower substrate 30 because the pixel and common electrodes 34 and 36 are formed on the lower substrate 30. Accordingly, the liquid crystal molecules are twisted such that the long axes thereof are aligned with the direction of the electric field. Thus, the liquid crystal molecules are aligned such that the long axes thereof are parallel with the line perpendicular to the pixel and common electrodes 34 and 36.

By operating in the modes described above and with additional elements such as polarizers and alignment layers, the IPS-LCD device displays images. The IPS-LCD device has wide viewing angles and low color dispersion because the pixel and common electrodes are placed together on the lower substrate. These wide viewing angles of the IPS-LCD device are about 70 degrees in up-and-down and right-and-left sides. Moreover, the fabricating processes of this IPS-LCD device are simpler than other various LCD devices.

However, because the pixel and common electrodes are disposed on the same substrate (i.e., the lower substrate), the transmittance and aperture ratio are low. Further, there are some other disadvantages in the conventional IPS-LCD device. For example, the response time of the conventional IPS-LCDs is relatively slow and should be improved. In addition, the cell gap of the conventional IPS-LCDs provides very small margins for misalignment and should be improved to be more uniform.

For the sake of discussing the above-mentioned IPS-LCD device in detail, with reference to FIG. 6, the basic structure of the IPS-LCD device will be described in detail.

Figure 6:
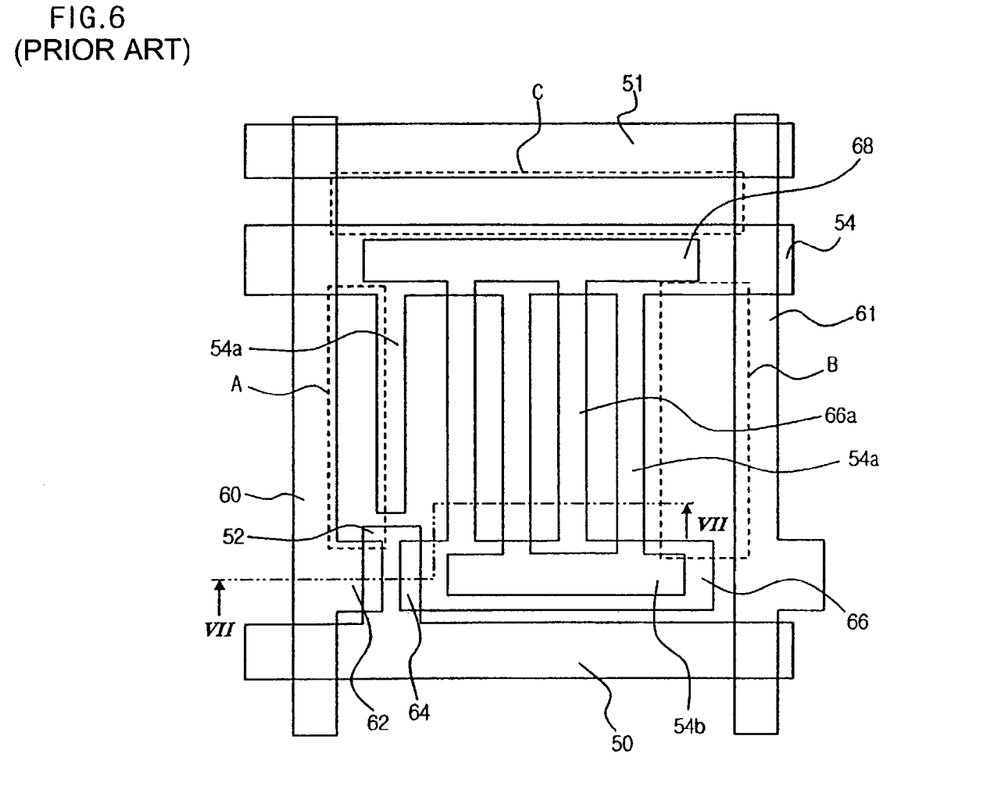
FIG. 6 is a plan view illustrating an array substrate of the conventional IPS-LCD device.

FIG. 6 is a plan view illustrating an array substrate of the conventional IPS-LCD device. As shown, gate lines 50 and 51 and common line 54 are transversely arranged parallel with each other. Data lines 60 and 61 are arranged perpendicular to the gate and common lines 50 (and 51) and 54. Gate electrode 52 and source electrode 62 are positioned near a cross point of the gate and data lines 50 and 60, and communicate with the gate line 50 and the data line 60, respectively. Herein, the source electrode 62 overlaps a portion of the gate electrode 52.

A plurality of common electrodes 54a are positioned spaced apart from each other and perpendicular to the common line 54. The common electrodes 54a communicate with the common line 54. Some common electrodes 54a also communicate with a common electrode connector 54b that is parallel to the gate line 50 and positioned at first ends of the common electrodes 54a. A first pixel connecting line 66 communicates with a drain electrode 64, and a plurality of pixel electrodes 66a are positioned perpendicular to the first pixel connecting line 66. First ends of the pixel electrodes 66a communicate with the first pixel connecting line 66, and the second ends of pixel electrodes 66a communicate with a second pixel connecting line 68 that is positioned over the common line 54. Accordingly, the common electrodes 54a and the pixel electrodes 66a are parallel with and spaced apart from each other in an alternating pattern.

FIGS. 7A to 7D are cross-sectional views taken along the line VII-VII of FIG. 6 and illustrate steps of manufacturing processes of the array substrate for use in the conventional IPS-LCD device.

Figure 7A:
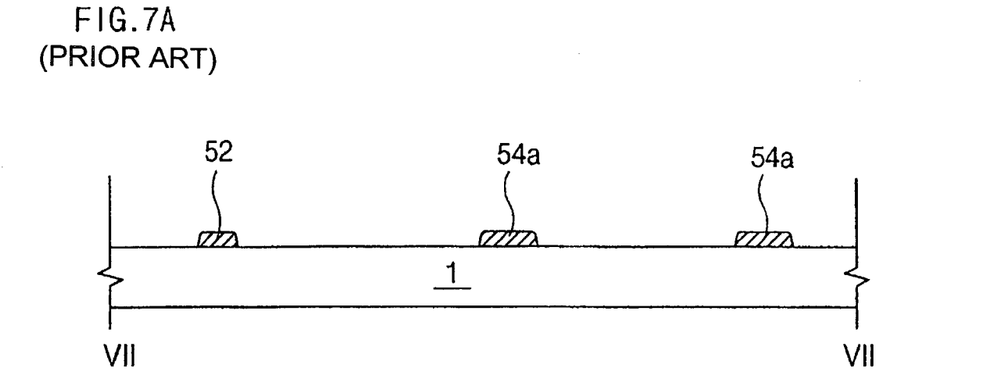
FIGS. 7A to 7D are cross-sectional views taken along the line VII-VII of FIG. 6 and illustrate steps of manufacturing processes of the array substrate for use in the conventional IPS-LCD device.

Referring to FIG. 7A, a first metal layer is deposited on a substrate 1 and then patterned to form the gate lines 50 and 51 (see FIG. 6), the gate electrode 52, the common line 54 (see FIG. 6) and the plurality of common electrodes 54a. Further, the common electrode connector 54b is also formed with the common electrodes 54a. Aluminum (Al), Chrome (Cr), Molybdenum (Mo) or Tungsten (W) is mainly used for the first metal layer.

Figure 7B:
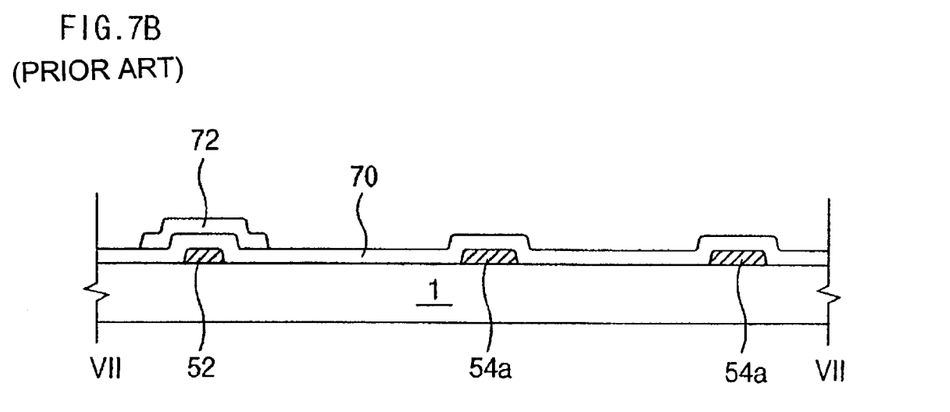

Now, referring to FIG. 7B, a gate insulation layer 70 is deposited on the substrate 1 to cover the patterned first metal layer. Next, an active layer 72 is formed on the gate insulation layer 70, especially over the gate electrode 52. The gate insulation layer 70 is usually made of Silicon Nitride ($SiN_x$) or Silicon Oxide ($SiO_2$), while the active layer comprises a pure amorphous silicon (a-Si:H) and an impurity-doped amorphous silicon (n+a-Si:H).

Figure 7C:
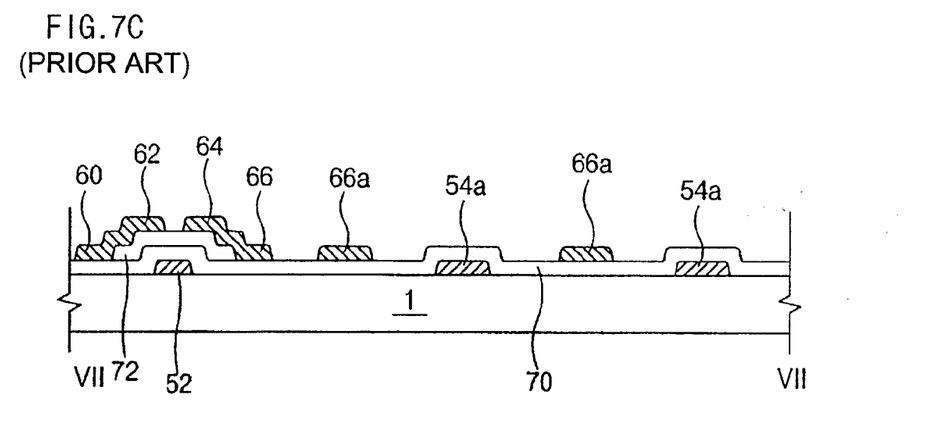

Referring to FIG. 7C, a second metal layer is deposited on the gate insulation layer 70 and active layer 72, and then patterned so as to form the source and drain electrodes 62 and 64, the data line 60 (and 61 of FIG. 6) and the plurality of pixel electrodes 66a. Further, the first and second pixel connecting lines 66 and 68 (see FIG. 6) are formed with the pixel electrodes 66a. Aluminum (Al), Chrome (Cr), Molybdenum (Mo) or Tungsten (W) is mainly used for the second metal layer, like the first metal layer.

As shown in FIG. 7C, the source and drain electrodes 62 and 64 are formed on the active layer 72 and particularly over portions of the gate electrode 52 such they respectively overlap opposite ends of the gate electrode 52. The pixel electrodes 66a are formed on the gate insulation layer 70 and spaced apart from each other. Also, each pixel electrode 66a is parallel with and spaced apart from the adjacent common electrodes 54a.

Figure 7D:
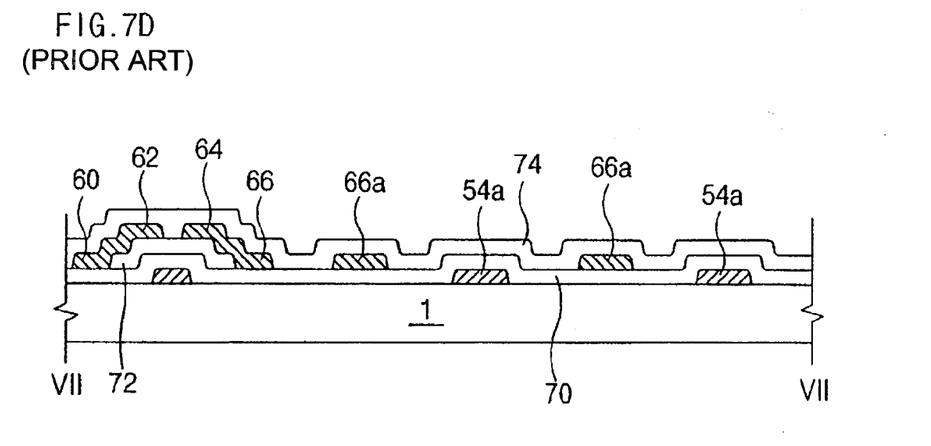

Referring to FIG. 7D, a passivation layer 74 is formed on the surfaces of the above-mentioned intermediates. The passivation layer 74 has a high humidity resistance and a high durability in order to protect the active layer 72 from being affected by moisture, foreign substances, etc.

As described above, the IPS-LCD device includes the common and pixel electrodes 54a and 66a in the array substrate such that the wide viewing angle can be achieved. However, the aperture ratio is poor because the common and pixel electrodes 54a and 66a are formed of the opaque metal like the source and drain electrodes 62 and 64.

Further, referring back to FIG. 6, an area "A" between the data line 60 and the adjacent common electrode 54a, an area "B" between the data line 61 and the adjacent common electrode 54a, and an area "C" between the common line 54 and the adjacent gate line 51 are non-display areas. Namely, these areas "A", "B" and "C" do not affect image display because the liquid crystal in these areas does not properly function and is not operated when the voltage is supplied to the plurality of pixel electrodes 66a. Therefore, a black matrix covers these areas "A", "B" and "C" in a later manufacturing step. As a result, the black matrix shields these areas "A", "B" and "C" from light generated from the backlight device (not show), thereby diminishing the brightness of the IPS-LCD device. Furthermore, in order to prevent the short circuit between the gate line 51 and the common line 54 when forming the gate and common lines 51 and 54 in the same plane, the area "C" is enlarged, thereby resulting in lowering the aperture ratio.

Still referring to FIG. 6, the common electrodes 54a adjacent to the data lines 60 and 61 are affected by the cross talk when the data lines 60 and 61 receive the signal voltages. Thus, the common electrodes 54a need to be far away from the data lines 60 and 61, and the areas "A" and "B" are enlarged to decrease this cross talk. Therefore, the aperture ratio is accordingly decreased.

As widely known, the aperture ratio is closely related to the brightness. Further, the stronger the brightness is, the more powerful the backlight device is. From these reasons, the above-mentioned IPS-LCD device has high power consumption.

SUMMARY OF THE INVENTION

Accordingly, the present invention is directed to an IPS-LCD device that substantially obviates one or more of the problems due to limitations and disadvantages of the related art.

An object of the present invention is to provide an IPS-LCD device having a high aperture ratio.

Another object of the present invention is to provide the IPS-LCD device that has a high brightness.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

In order to achieve the above object, the preferred embodiment of the present invention provides an in-plane switching liquid crystal display (IPS-LCD) device including first and second substrates opposite to and spaced apart from each other; a gate line arranged in one direction on the first substrate; a common line arranged on the first substrate, the common line being parallel with the gate line and spaced apart from the gate line; a gate insulation layer on the substrate, the gate insulation layer covering the common and gate lines; a data line on the gate insulation layer, the data line being perpendicular to the gate line; a thin film transistor receiving signals from the gate and data lines, the thin film transistor including a gate electrode, the gate insulation layer, an active layer, and source and drain electrodes; a first passivation layer on the gate insulation layer so as to cover the thin film transistor and data line, the first passivation layer having a plurality of common line contact holes that penetrate both the first passivation layer and the gate insulation layer to the common line so as to expose portions of the common line; a plurality of common electrodes being parallel with the data line on the first passivation layer, each common electrode contacting the common line through each common line contact hole; a second passivation layer on the first passivation layer so as to cover the plurality of common electrodes, the second passivation layer having a drain contact hole that penetrates both the first and second passivation layer to the drain electrode of the thin film transistor; a pixel connecting line being parallel with the gate line on the second passivation layer, the pixel connecting line contacting the drain electrode through the drain contact hole; a plurality of pixel electrodes perpendicularly extending from the pixel connecting line, each pixel electrode arranged between the adjacent common electrodes; and a liquid crystal layer between the first and second substrates.

The common and pixel electrodes and the pixel connecting line are formed of the transparent conductive material such as indium tin oxide (ITO) or indium zinc oxide (IZO).

The gate insulation layer and the second passivation layer are one of Silicon Nitride ($SiN_x$) and Silicon Oxide ($SiO_2$).

The first passivation layer is formed of an organic material such as benzocyclobutene (BCB) or acryl.

In order to accomplish the above objects, the principles of the present invention further provide a method of fabricating an array substrate for use in an in-plane switching LCD device, including: forming a gate electrode, a gate line and a common electrode on a substrate by depositing and then patterning a first metal layer; forming a gate insulation layer on the substrate to cover the patterned first metal layer; forming an active layer on the gate insulation layer and over the gate electrode; forming a data line and source and drain electrodes by depositing and then patterning a second metal layer, the data line being perpendicular to the gate line on the gate insulation layer, the source electrode extending from the data line over the active layer, and the drain electrode being spaced apart from the source electrode on the active layer; forming a first passivation layer on the gate insulation layer so as to cover the patterned second metal layer, the first passivation layer having a plurality of common line contact holes that penetrate both the first passivation and gate insulation layers to the common line; forming a plurality of common electrodes that are parallel with the data line on the first passivation layer, each common electrode contacting the common line through each common line contact hole; forming a second passivation layer on the first passivation layer so as to cover the plurality of common electrodes, the second passivation layer having a drain contact hole that penetrates both the first and second passivation layer to the drain electrode; and forming a pixel connecting line and a plurality of pixel electrodes, the pixel connecting line being parallel with the gate line on the second passivation layer and contacting the drain electrode through the drain contact hole, the plurality of pixel electrodes perpendicularly extending from the pixel connecting line, and each pixel electrode arranged between the adjacent common electrodes.

A method of forming the plurality of common electrodes includes depositing and patterning a first transparent conductive material such as indium tin oxide (ITO) or indium zinc oxide (IZO).

A method of forming the pixel connecting line and pixel electrodes includes depositing and patterning a second transparent conductive material such as indium tin oxide (ITO) or indium zinc oxide (IZO).

The first passivation layer is an organic material such as benzocyclobutene (BCB) or acryl.

The gate insulation layer and the second passivation layer are one of Silicon Nitride ($SiN_x$) and Silicon Oxide ($SiO_2$).

First and second metal layers include a material selected from a group consisting of chromium (Cr), aluminum (Al), aluminum alloy (Al alloy), molybdenum (Mo), tantalum (Ta), tungsten (W), antimony (Sb), and an alloy thereof.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiment of the invention and together with the description serve to explain the principles of the invention.

In the drawings.

DETAILED DESCRIPTION OF THE PREFERRED EMBODIMENTS

Reference will now be made in detail to the preferred embodiment of the present invention, examples of which are illustrated in the accompanying drawings. Wherever possible, the same reference numbers will be used throughout the drawings to refer to the same or like parts.

Figure 8:
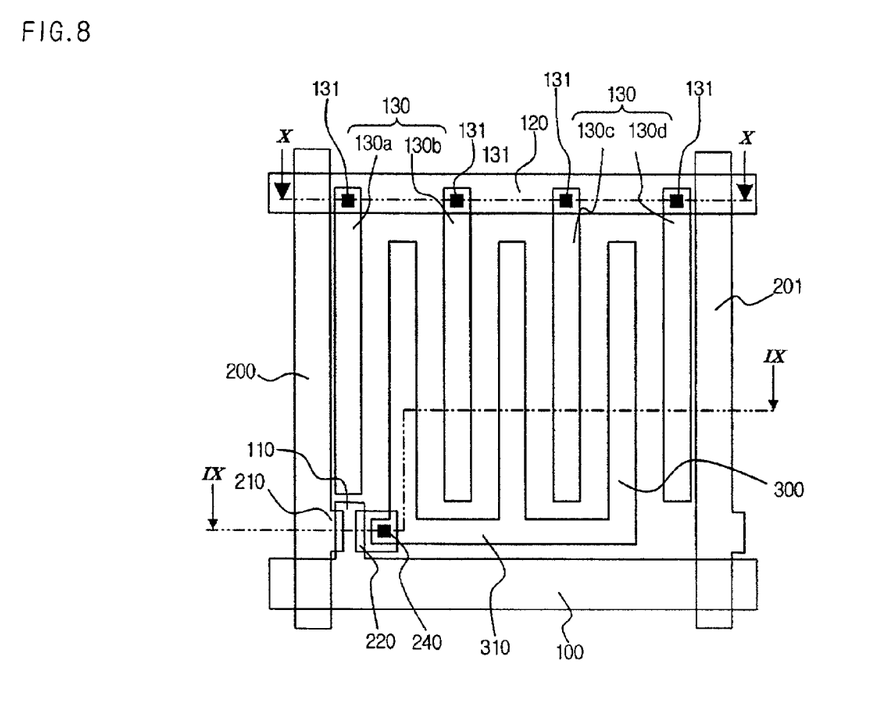
FIG. 8 is a plan view illustrating an array substrate of an IPS-LCD device according to the present invention.

FIG. 8 is a plan view illustrating an array substrate of an IPS-LCD device according to the present invention.

Figure 9A:
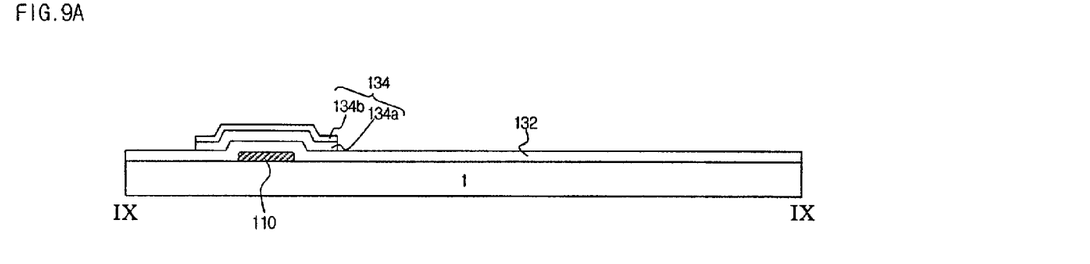
FIGS. 9A to 9E and 10A to 10D are cross-sectional views respectively taken along the lines IX-IX and X-X of FIG. 8 and illustrate steps of manufacturing processes of the array substrate for use in the IPS-LCD device according to the present invention.

As shown in FIG. 8, a gate line 100 is transversely disposed on a substrate 1 (see FIG. 9A). A common line 120 is spaced apart from and is parallel to the gate line 100. Data lines 200 and 201 are spaced apart from each other are disposed across and perpendicular to the gate and the common lines 100 and 120.

Near an intersection of the gate and data lines 100 and 200, gate and source electrodes 110 and 210 are positioned and electrically connected with the gate and data lines 100 and 200, respectively. A drain electrode 220, including a drain contact hole 240, is spaced apart from the source electrode 210 and overlaps a portion of the gate electrode 110. The source electrode 210 also overlaps a portion of the gate electrode 110.

A pixel connecting line 310 electrically contacts the drain electrode 220 through the drain contact hole 240, and is disposed parallel with the gate line 100. A plurality of pixel electrodes 300 are disposed perpendicular to the pixel connecting line 310, and communicate with the pixel connecting line 310.

A plurality of common electrodes 130 are disposed parallel with the pixel electrodes 300. Each common electrode 130a, 130b, 130c or 130d electrically contacts the common line 120 through a respective common line contact hole 131, and is spaced apart from the adjacent pixel electrodes 300. Therefore, the common electrodes 130 are electrically connected to each other via the common line 120. As shown in FIG. 8, the common and pixel electrodes 130 and 300 are arranged in an alternating pattern.

The common line 120 and the gate and data lines 100 and 200 (and 201) are an opaque metal, while the common and pixel electrodes 130 and 300 are a transparent conductive material. Preferably, the opaque metal is selected from a group consisting of Chromium (Cr), Aluminum (Al), Aluminum alloy (Al alloy), Molybdenum (Mo), Tantalum (Ta), Tungsten (W), Antimony (Sb), and the like, while the transparent conductive material is Indium Tin Oxide (ITO) or Indium Zinc Oxide (IZO).

Now, referring to FIGS. 9A to 9E and 10A to 10D, a fabricating process for the array substrate shown in FIG. 8 is provided.

FIGS. 9A to 9E and 10A to 10D are cross-sectional views taken along the lines IX-IX and X-X of FIG. 8, respectively, and illustrate steps of the manufacturing process of the array substrate for use in the IPS-LCD device according to the present invention.

Figure 10A:
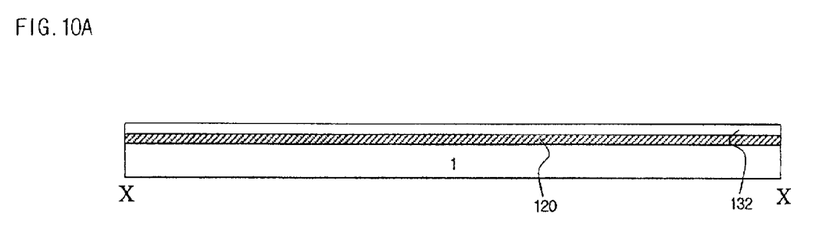

Referring to FIGS. 9A and 10A, a first metal layer is deposited on a substrate 1 and then patterned so as to form the gate line 100 (see FIG. 8), the gate electrode 110 and the common line 120. The gate electrode 110 is extended from the gate line 100 of FIG. 8. As mentioned before, Chromium (Cr), Aluminum (Al), Aluminum alloy (Al alloy), Molybdenum (Mo), Tantalum (Ta), Tungsten (W), Antimony (Sb), or the like is used for the first metal layer.

Thereafter, a gate insulation layer 132 is deposited on the substrate 1 to cover the patterned first metal layer. Next, an active layer 134 is formed on the gate insulation layer 132, especially over the gate electrode 110. The gate insulation layer 132 is usually made of Silicon Nitride ($SiN_x$) or Silicon Oxide ($SiO_2$). The active layer 134 is comprised of a pure amorphous silicon (a-Si:H) 134a and an impurity-doped amorphous silicon (n+a-Si:H) 134b.

Figure 9B:
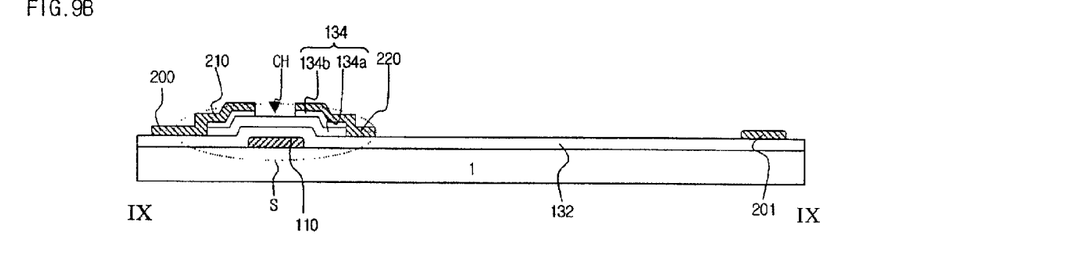
Figure 10B:
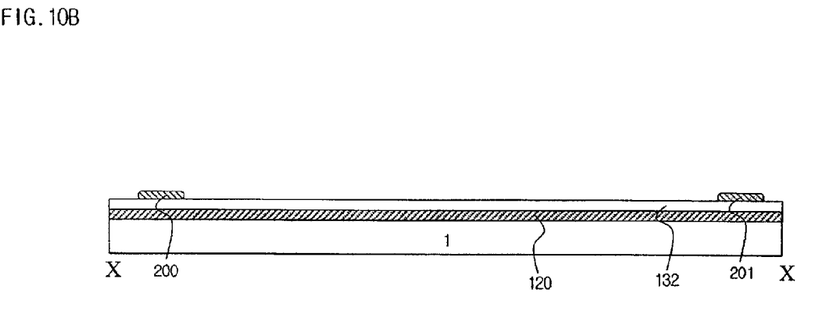

Now, referring to FIGS. 9B and 10B, a second metal layer is deposited on the gate insulation layer 132 and active layer 134, and then patterned so as to form the source and drain electrodes 210 and 220 and the data lines 200 and 201. The source electrode 210 is extended from the data line 200 and the drain electrode 220 is spaced apart from the source electrode 210. Both source and drain electrodes 200 and 220 overlap the opposite ends of the gate electrode 110. After forming the source and drain electrodes 210 and 220, a portion of the impurity-doped amorphous silicon 134b between the source and drain electrodes 210 and 220 is removed in order to form a channel region "CH" on the pure amorphous silicon 134a. Accordingly, a thin film transistor (TFT) "S" is complete. The source and drain electrodes 210 and 220 and the data lines 200 and 201 are usually made of the same material as the first metal layer.

Figure 9C:
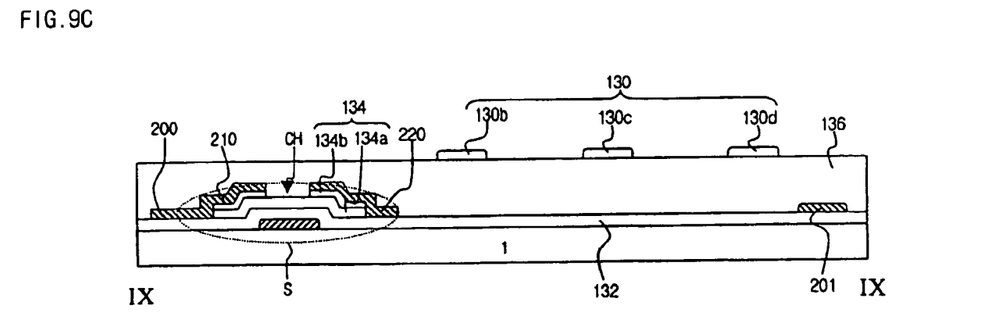
Figure 10C:
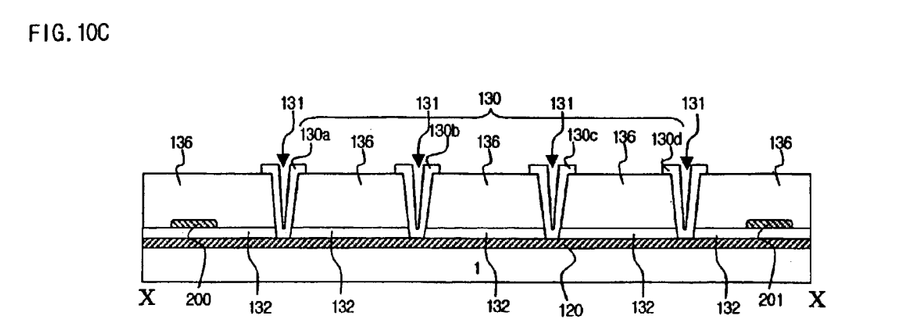

Referring to FIGS. 9C and 10C, a first passivation layer 136 is formed on the surfaces of the above-mentioned intermediates, so the first passivation layer 136 covers the TFT "S" and the patterned second metal layer. For a first passivation layer 136, an organic material such as benzocyclobutene (BCB) or acryl is used due to its superior light transmittance and low dielectric constant. Thereafter, the common line contact holes 131 are formed over the common line 120, as shown in FIG. 10C. The common line contact holes 131 penetrate both the first passivation layer 136 and the gate insulation layer 132 in order to expose the portions of the common line 120.

Still referring to FIGS. 9C and 10C, a first transparent conductive material is deposited on the first passivation layer 136 and then patterned to form a plurality of common electrodes 130 that are bar-shaped, as shown in FIG. 8. As aforementioned, the first transparent conductive material is Indium Tin Oxide (ITO) or Indium Zinc Oxide (IZO). Each common electrode 130a, 130b, 130c or 130d is parallel with the data lines 200 and 201, and spaced apart from each other. Further, the common electrodes 130 contact the common line 120 through the common line contact holes 131.

Figure 9D:
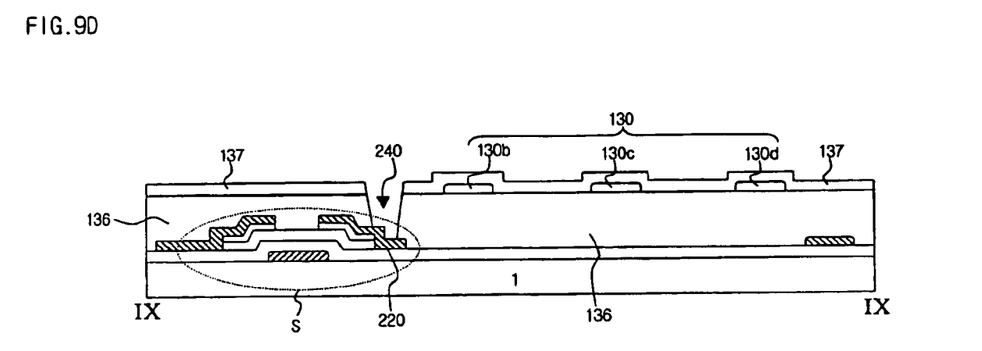
Figure 10D:
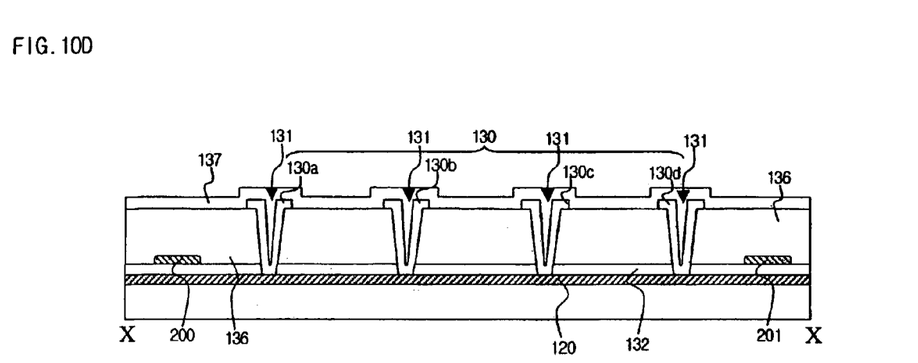

Now, referring to FIGS. 9D and 10D, a second passivation layer 137 is deposited on the first passivation layer 136 to cover the common electrodes 130. The second passivation layer 137 is preferably silicon nitride ($SiN_x$) or silicon oxide ($SiO_2$). Thereafter, the drain contact hole 240 is formed by patterning the portion of both the first and second passivation layers 136 and 137. Namely, the drain contact hole 240 penetrates the first and second passivation layers 136 and 137 and exposes the portion of the drain electrode 220 of the TFT "S".

Figure 9E:
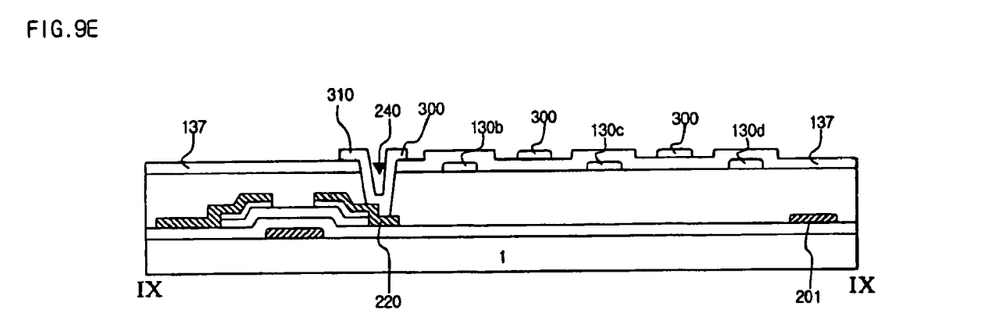

Referring to FIG. 9E, a second transparent conductive material is deposited on the second passivation layer 137 having the drain contact hole 240. Thereafter, the second transparent conductive material is patterned so as to form the pixel electrodes 300 and pixel connecting line 310. Since the pixel electrodes 300 are connected with the pixel connecting line 310, which contacts the drain electrode 220 through the drain contact hole 240, the pixel electrodes 300 electrically communicates with the drain electrode 220. Each pixel electrode 300 is arranged between the adjacent common electrodes, such that pixel and the common electrodes are disposed in an alternating manner as shown in FIGS. 8 and 9E. Here, the second transparent conductive material is Indium Tin Oxide (ITO) or Indium Zinc Oxide (IZO), like the first transparent conductive material.

As described hereinbefore, the array substrate according to the present invention includes three insulating layers (i.e., the gate insulation layer and the first and second passivation layers). Each insulating layer insulates the conductive layers (i.e., the patterned first and second metal layer and the patterned first and second transparent conductive material) against each other. Since the organic material is used for insulating the data line against the common electrodes, areas between the data line and the common electrodes (see reference letters "A" and "B" of FIG. 6) can be reduced. Namely, the organic material such as benzocyclobutene (BCB) or acryl has a low dielectric constant, and thus, cross talk between the data line and the common electrode is substantially minimized. For example, the data line 201 is insulated against the common electrode 130d as shown in FIG. 9E. Thus, the area between the data line 201 and the common electrode 130d can be reduced. Therefore, the common electrode can be closer to the data line, thereby raising the aperture ratio. As a related advantage, the brightness of the IPS-LCD device increases according to the present invention.

Furthermore, compared to the conventional IPS-LCD device, the array substrate of the inventive IPS-LCD device has the common line and common electrodes in different planes. Namely, the common electrodes are not formed when forming the common line. As described before, the common electrodes are formed on the first passivation layer, i.e., the organic material, and contact the common line through the common line contact holes that penetrate both the passivation layer and the gate insulation layer. Moreover, the common electrodes are formed of the transparent conductive material such as ITO or IZO. Further, the pixel electrodes and the pixel connecting line are also made of this transparent conductive material. The transparent conductive material is substantially substituted for the opaque metal in the present invention, compared to the conventional art. As a result, the brightness of the IPS-LCD device also increases according to the present invention. As a related advantage, the overall brightness of the backlight device can be lowered because more light passes through the IPS-LCD, and thus, low electric power consumption can be obtained. Compared with the aperture ratio of a conventional IPS-LCD device employing the opaque metal as the common and pixel electrodes, the aperture ratio of the inventive IPS-LCD device employing the array substrate with the transparent common and pixel electrodes increases by more than 10%. Therefore, the aperture ratio problem of the conventional IPS-LCD device is reduced or eliminated.

As described herein, the IPS-LCD device according to the preferred embodiments of the present invention has the following advantages.

First, because of the transparent common and pixel electrodes, the aperture ratio is increased.

Second, because of the high aperture ratio, the light generated from the backlight device largely passes through the substrates, thereby improving the brightness of the IPS-LCD device.

Third, because of the improved brightness, the electric power consumption of the backlight device is decreased.

Fourth, due to the organic material that insulates the data lines against the common electrodes, the cross talk that is created by the signals flowing the data lines and affects the common electrodes is minimized, thereby allowing a reduced distance between the data lines and the common electrodes. Therefore, the aperture ratio increases as well.

It will be apparent to those skilled in the art that various modifications and variation can be made in the array substrate and the manufacturing method thereof of the present invention without departing from the spirit or scope of the invention. Thus, it is intended that the present invention cover the modifications and variations of this invention provided they come within the scope of the appended claims and their equivalents.

What is claimed is:

1. An in-plane switching liquid crystal display device comprising:
   first and second substrates;
   a gate line arranged in one direction on the first substrate;
   a common line arranged on the first substrate;
   a gate insulation layer on the first substrate;
   a data line on the gate insulation layer;
   a first passivation layer on the gate insulation layer;
   a plurality of common electrodes in contact with the first passivation layer;
   a second passivation layer on the first passivation layer, wherein the second passivation layer is an inorganic material;
   a plurality of pixel electrodes on the second passivation layer, wherein the plurality of common electrodes and plurality of pixel electrodes are parallel to and spaced apart from each other; and
   a liquid crystal layer between the first and second substrates,
   wherein the gate insulation layer and the first passivation layer include a plurality of common line contact holes,
   wherein the first passivation layer and the second passivation layer include a drain contact hole for a drain electrode,
   wherein one of the plurality of pixel electrodes is electrically connected to the drain electrode through the drain contact hole, and
   wherein each common electrode is electrically connected with the common line through a corresponding common line contact hole.

2. The device of claim 1, wherein the common and pixel electrodes are formed of a transparent conductive material.

3. The device of claim 2, wherein the transparent conductive material includes at least one of indium tin oxide (ITO) or indium zinc oxide (IZO).

4. The device of claim 1, wherein the gate insulation layer and the second passivation layer are one of Silicon Nitride ($SiN_x$) and Silicon Oxide ($SiO_2$).

5. The device of claim 1, wherein the first passivation layer is formed of an organic material.

6. The device of claim 5, wherein the organic material is one of benzocyclobutene (BCB) and acryl.

7. The device of claim 1, wherein the common line is parallel with the gate line and spaced apart from the gate line.

8. The device of claim 1, wherein the data line is perpendicular to the gate line.

9. The device of claim 1, further comprising a thin film transistor at a crossing point of the gate line and the data line.

10. The device of claim 9, wherein the thin film transistor includes a gate electrode, an active layer, and source and drain electrodes.

11. The device of claim 1, wherein each pixel electrode is arranged between the adjacent common electrodes.

12. A method of fabricating an array substrate for an in-plane switching liquid crystal device, the method comprising:
   forming a gate electrode, a gate line and a common line on a substrate with a first metal layer;
   forming a gate insulation layer on the substrate;
   forming a data line and source and drain electrodes with a second metal layer;
   forming a first passivation layer on the gate insulation layer;
   forming a plurality of common electrodes in contact with the first passivation layer;
   forming a second passivation layer on the first passivation layer, wherein the second passivation layer is an inorganic material; and
   forming a plurality of pixel electrodes on the second passivation layer,
   wherein forming the gate insulation layer and the first passivation layer includes forming a plurality of common line contact holes,
   wherein a drain contact hole that exposes a drain electrode is formed in the first and second passivation layers,
   wherein one of the plurality of pixel electrodes is formed to electrically connect to the drain electrode through the drain contact hole, and
   wherein each of the plurality of common electrodes is electrically connected with the common line through each common line contact hole.

13. The method of claim 12, wherein the step of forming the plurality of common electrodes comprises depositing and patterning a first transparent conductive material.

14. The method of claim 13, wherein the first transparent conductive material is one of indium tin oxide (ITO) and indium zinc oxide (IZO).

15. The method of claim 12, wherein the step of forming the pixel electrodes comprises depositing and patterning a second transparent conductive material.

16. The method of claim 15, wherein the second transparent conductive material is one of indium tin oxide (ITO) and indium zinc oxide (IZO).

17. The method of claim 12, wherein the first passivation layer is an organic material.

18. The method of claim 17, wherein the organic material is one of benzocyclobutene (BCB) and acryl.

19. The method of claim 12, wherein the gate insulation layer and the second passivation layer are one of Silicon Nitride ($SiN_x$) and Silicon Oxide ($SiO_2$).

20. The method of claim 12, wherein the first and second metal layer include a material selected from a group consisting of chromium (Cr), aluminum (Al), aluminum alloy (Al alloy), molybdenum (Mo), tantalum (Ta), tungsten (W), antimony (Sb), and an alloy thereof.

21. The method of claim 12, wherein each pixel electrode is arranged between adjacent common electrodes.

22. An in-plane switching liquid crystal display device, comprising:
   first and second substrates;
   gate lines on the first substrate;
   data lines perpendicular to the gate lines to form a plurality of pixel regions;

a thin film transistor in each of the pixel regions at a crossing point of the data lines and the gate lines;

a common line on the first substrate in each of the pixel regions, the common line parallel to the gate lines;

a first insulation layer over the gate lines, the data lines being on the first insulation layer;

a second insulation layer over the data lines and the common line;

a plurality of first contact holes through the first and second insulation layers over the common line;

a plurality of common electrodes in contact with the second insulation layer, wherein the common electrodes contact the common line via the first contact holes;

a third insulation layer on the common electrodes and the second insulation layer, wherein the third insulation layer is an inorganic material;

a second contact hole through the second and third insulation layers over a drain electrode of the thin film transistor;

a plurality of pixel electrodes on the third insulation layer, wherein one of the plurality of pixel electrodes is electrically connected to the drain electrode through the second contact hole; and a liquid crystal interposed between the first and second substrates.

23. The device of claim 22, wherein the pixel electrodes electrically communicate with one another via a transverse pixel electrode perpendicular to the common electrodes.

24. The device of claim 22, wherein the pixel electrodes and the common electrodes are formed of a transparent conductive material.

25. The device of claim 22, wherein the transparent conductive material is one of indium tin oxide and indium zinc oxide.

26. The device of claim 22, wherein the first and third insulation layers are formed of one of Silicon Nitride (SiNx) and Silicon Oxide.

27. The device of claim 22, wherein the second insulation layer is formed of an organic material.

28. The device of claim 27, wherein the organic material is one of benzocyclobutene (BCB) and acryl.

* * * * *